United States Patent
Kawasaki et al.

[11] Patent Number: 6,031,820
[45] Date of Patent: *Feb. 29, 2000

[54] CELL TRANSFER CONTROL METHOD AND CELL TRANSFER CONTROL DEVICE

[75] Inventors: Takeshi Kawasaki; Jyoei Kamoi, both of Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/835,798

[22] Filed: Apr. 15, 1997

Related U.S. Application Data

[63] Continuation of application No. 08/407,776, Mar. 21, 1995, abandoned.

[30] Foreign Application Priority Data

May 31, 1994 [JP] Japan ................................. 6-118631

[51] Int. Cl.[7] ........................... H04J 3/16; H04L 12/56
[52] U.S. Cl. ................... 370/230; 370/392; 370/397; 370/399; 370/412; 370/468
[58] Field of Search ................... 370/229, 230–234, 370/252, 253, 395, 396–399, 412, 463, 465, 468

[56] References Cited

U.S. PATENT DOCUMENTS

| | | | |
|---|---|---|---|
| 4,896,316 | 1/1990 | Lespagnol et al. | 370/60 |
| 5,166,894 | 11/1992 | Saito | 370/94.1 |
| 5,193,151 | 3/1993 | Jain | 370/94.1 |
| 5,241,536 | 8/1993 | Grimble et al. | 370/94.1 |
| 5,280,483 | 1/1994 | Kamoi et al. | 370/60 |
| 5,285,445 | 2/1994 | Lehnert et al. | 370/60 |
| 5,285,446 | 2/1994 | Yonchara | 370/60.1 |
| 5,335,222 | 8/1994 | Kamoi et al. | 370/60 |
| 5,400,329 | 3/1995 | Jokura et al. | 370/60 |
| 5,459,724 | 10/1995 | Jeffrey et al. | 370/60 |
| 5,509,008 | 4/1996 | Genda et al. | 370/60.1 |
| 5,517,495 | 5/1996 | Lund et al. | 370/60 |
| 5,694,554 | 12/1997 | Kawabata et al. | 370/230 |
| 5,875,174 | 2/1999 | Okazaki | 370/230 |

*Primary Examiner*—Douglas W. Olms
*Assistant Examiner*—Seema S. Rao
*Attorney, Agent, or Firm*—Helfgott & Karas, P.C.

[57] ABSTRACT

A method and device for controlling transfer of cells in an ATM equipment, using the statistical multiplexing effect to control the transfer speed at regular intervals, so as to realize an efficient management and a fine control of the information transfer speed. The cell control device includes a cell transfer control buffer, a cell transfer timing operating unit that performs a desired operation to calculate a cell transfer timing, using a first parameter T and a second parameter X, and a cell transfer control unit that controls the transfer timing of the cell from the buffer, based on the result from the cell transfer timing operating unit, to perform a cell transfer control at a peak rate of X/T in correspondence with a processing rate of the ATM equipment.

27 Claims, 12 Drawing Sheets

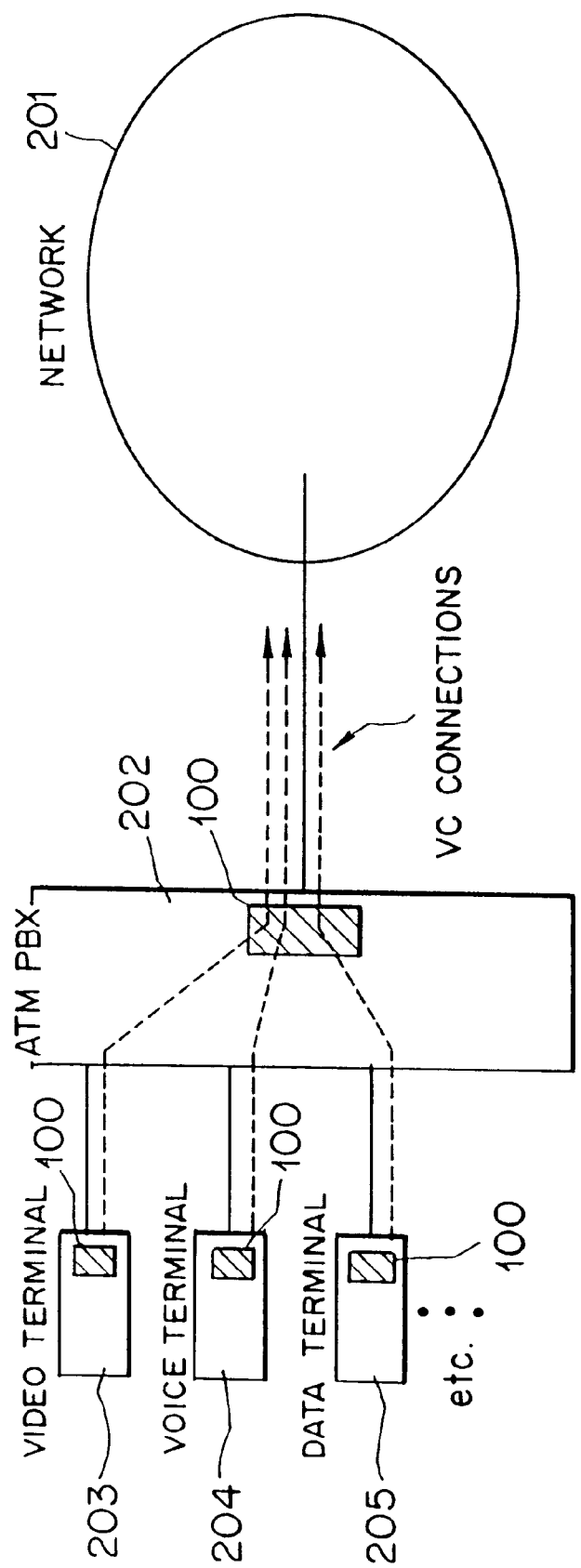

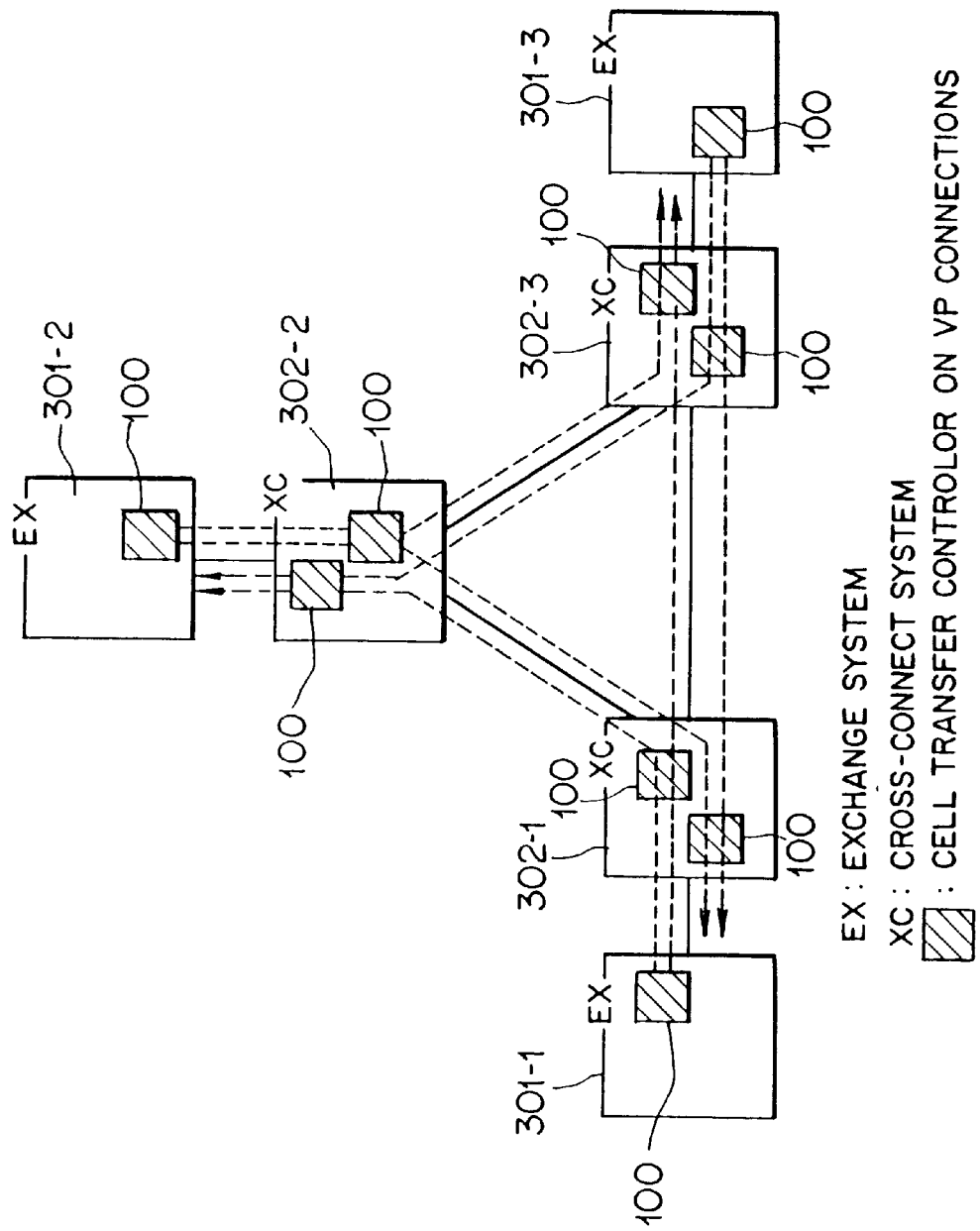

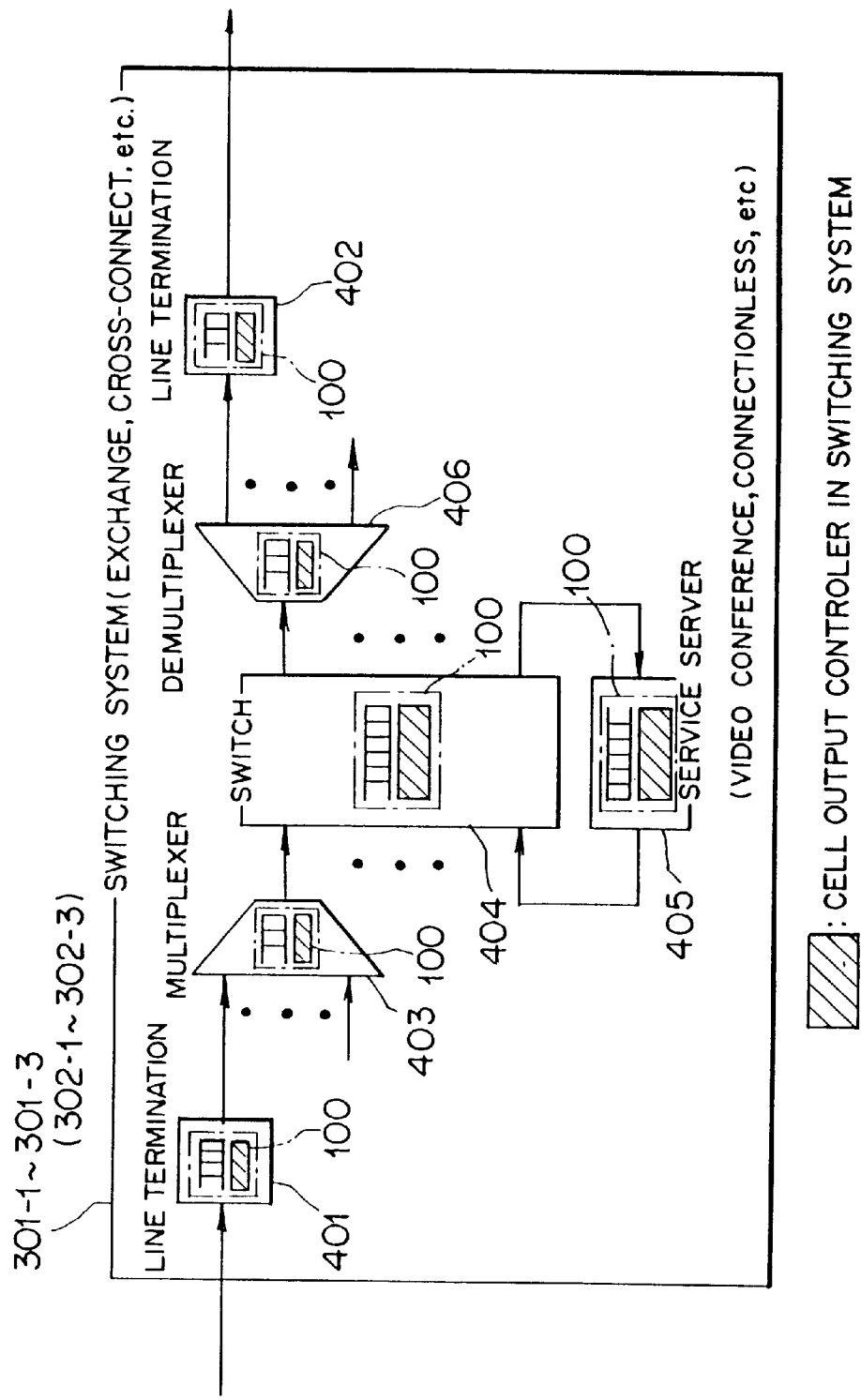

CELL TRANSFER CONTROL METHOD AND CELL TRANSFER CONTROL DEVICE

This is a continuation of application Ser. No. 08/407,776, filed Mar. 21, 1995, now abandoned.

BACKGROUND OF THE INVENTION

1) Field of the Invention

The present invention relates to a method and a device each for controlling a cell transfer in an asynchronous transfer mode (ATM) device that handles fixed-length cells each including logical channel information and data information.

2) Description of the Related Art

Generally, in order to allocate network resources to each communication by means of statistical multiplexing, ATM equipment needs a cell transmission limiting capability to prevent congestion due to excessive uses of allocated network resources as well as overflow due to cell inflow to a receiving terminal at speeds over a processing speed, caused by cells disorderly transferred from a terminal and a variation in delay in a network.

For example, as such an ATM transfer control method, a time-sharing method where the virtual channel (VC) or virtual path (VP) sent by each time slot is predetermined as well as a method which uses the shortest transfer interval being integer times one cell processing time of a device have been considered.

However, the former has a disadvantage in that the statistical multiplexing effect cannot be obtained because the capacity is completely separated every VP or VC. The latter has a disadvantage in that a fine control cannot be established because the controllable transfer speed is a fraction of an integer of the device processing speed or the range control becomes complicated because of the uneven division of the variable transmission speed.

SUMMARY OF THE INVENTION

The present invention is made to overcome the above mentioned problems. An object of the present invention is to provide a cell transfer control method which can effectively use the statistical multiplexing effect and control the speed at even intervals, thus facilitating the range control and performing a fine control according to the information speed.

Another object of the invention is to provide a cell transfer control device which can effectively use the statistical multiplexing effect and control the speed at even intervals, thus facilitating the range control and performing a fine control according to information speed.

In order to achieve the above objects, according to the present invention, the cell transfer control method suitable for a device that handles a cell with a fixed length including logical channel information and data information, is characterized by the steps of performing a desired operation to calculate a cell transfer time using a first parameter T set to a desired value and a second parameter X set to a value less than the first parameter T and indicating information caused by one cell processing time; and performing a cell transfer control at a peak rate of X/T in correspondence with a processing rate of the processing device.

The cell transfer control further includes the steps of adding the first parameter T to a count parameter C at a cell transfer time; subtracting the second parameter X from the count parameter C every time the one cell process time passes; and sending the next cell when the count parameter C is smaller than the second parameter X.

Furthermore, the cell transfer control method further includes the steps of obtaining the next cell transferable time and a parameter at the cell transferable time, based on the parameter at the previous cell transfer time, when a cell transfer control buffer transfers a cell.

The cell transfer control method further includes the step of resetting the count parameter C to an initial value "0" at a cell transfer time of the buffer when the cell cannot be transferred at the next cell transferable time.

Moreover, the cell transfer control method further includes the steps of obtaining the next cell transferable time and a count parameter C at the cell transferable time, based on the count parameter C at the previous cell transfer time, when a cell is written into a cell transfer control buffer.

The cell transfer control method further includes the step of resetting the count parameter C to an initial value "0" just before a cell writing time to the buffer when the cell cannot be transferred at the next cell transferable time.

Furthermore, the cell transfer control method further includes the steps of setting respectively the first parameter T and the second parameter X to at least one piece of virtual path information and/or at least one piece of virtual channel information; performing a desired operation to calculate a cell transfer time using the first parameter T and the second parameter X; and subjecting the virtual path information and the virtual channel information to a cell transfer control at a peak rate of X/T with respect to the device processing rate.

The first parameter T is set to a value having information about the ratio of a device processing rate to the minimum exchange unit rate. The first parameter T is set to a value having information regarding time frame information, and the second parameter X is set to a value which has information about the number of cells to be sent between time frames.

According to the present invention, the cell transfer control device suitable for a device that handles a cell with a fixed length including logical channel information and data information, is characterized by a cell transfer control buffer for temporarily storing the cell; cell transfer timing operating means for performing a desired operation to calculate a cell transfer time, using a first parameter T set to a desired value and a second parameter X set to a value smaller than the first parameter T and having information caused by one cell processing time; and cell transfer control means for controlling the transfer timing of the cell from the buffer, based on the operation result from the cell transfer timing operating means, to perform a cell transfer control at a peak rate of X/T with respect to a device processing rate.

The cell transfer timing operating means subjects the first parameter T to an addition operation to a count parameter C at a cell transfer time; subtracts the second parameter X from the count parameter C every time the one cell processing time passes; and produces information regarding the next cell to be transferred to the cell transfer control means when the count parameter C is smaller than the second parameter X.

Furthermore, the cell transfer timing operating means obtains a transferable time of the next cell and a count parameter at the transferable time, based on the count parameter at the previous cell transfer time when the buffer transfers a cell.

The cell transfer timing operating means includes means that resets a count parameter to an initial value "0" at a cell transfer time from the buffer when the cell cannot be sent at the next cell transferable time.

Furthermore, the cell transfer timing operating means obtains a transferable time of the next cell and a count parameter at the transferable time, based on the count parameter at the previous cell transfer time, when a cell is written into the buffer.

The cell transfer timing operating means includes means that resets a count parameter to an initial value "0" just before a cell writing time to the buffer when the cell cannot be sent at the next cell transferable time.

Moreover, the cell transfer timing operating means includes memory means for setting respectively the first parameter T and the second parameter X to at least one piece of virtual channel information and/or at least one piece of virtual channel information; and operating means for performing a desired operation to calculate a cell transfer time, using the first parameter T and the second parameter X stored in the memory means.

As described above, according to the present invention, a desired operation is performed to calculate a cell transfer time using a first parameter T set to a desired value and a second parameter X set to a value less than said first parameter T and having information caused by one cell processing time, whereby a cell transfer control is performed at a peak rate of X/T with respect to a device processing rate. Hence, there is an advantage in that the speed can be controlled at regular intervals so that the easy range management and fine control following the information speed can be established.

The cell transfer control is performed by adding said first parameter T to a count parameter C at a cell transfer time; subtracting the second parameter X from the count parameter C every time the one cell process time passes; and sending the next cell when the resultant parameter is smaller than the second parameter X. As a result, the controlling of the speed at equal intervals facilitates the range management, thus realizing a fine control of the information speed.

Moreover, the cell transfer control is performed at a peak rate of X/T by obtaining the next cell transferable time and a count parameter at the cell transferable time, based on the count parameter at the previous cell transfer time, when a cell transfer control buffer transfers a cell or receives a writing cell. Hence, there is an advantage in that a fine control can be performed at an information speed established by the present invention.

The count parameter is reset to an initial value "0" at a cell transfer time of the buffer or a cell writing time to the cell transfer control buffer when the cell cannot be transferred at the next cell transferable time. Hence, a fine control can be performed according to information speed even if the cell transfer interval is out of the peak rate.

Moreover, the first parameter T and the second parameter X are set respectively to at least one piece of virtual path information and/or at least one piece of virtual channel information; and a desired operation is performed to calculate a cell transfer time using the first parameter T and the second parameter X, and then the virtual path information and the virtual channel information are subjected to a cell transfer control at a peak rate of X/T with respect to the device processing rate. A fine control can be performed according to the information speed, and a peak rate setting is controlled independently to each virtual path information and each virtual channel information, without depending on the set value of other virtual path information and the set value of other virtual channel information. Hence the statistical multiplexing effect can be effectively utilized.

The first parameter T is set to a value having information regarding the ratio of a device processing rate to the minimum exchange unit rate. The first parameter T is set to a value having information regarding time frame information and the second parameter X is set to a value which has information regarding the number of cells to be sent between time frames. This feature can realize setting a suitable parameter.

BRIEF DESCRIPTION OF THE DRAWINGS

FIG. 10 is a diagram explaining the place where the device according to the present invention is installed;

FIG. 11 is a diagram explaining the place where the device according to the present invention is installed; and FIG. 12 is a diagram explaining the place where the device according to the present invention is installed.

DESCRIPTION OF THE PREFERRED EMBODIMENTS (a) The Aspect of the Invention

Figure 1:
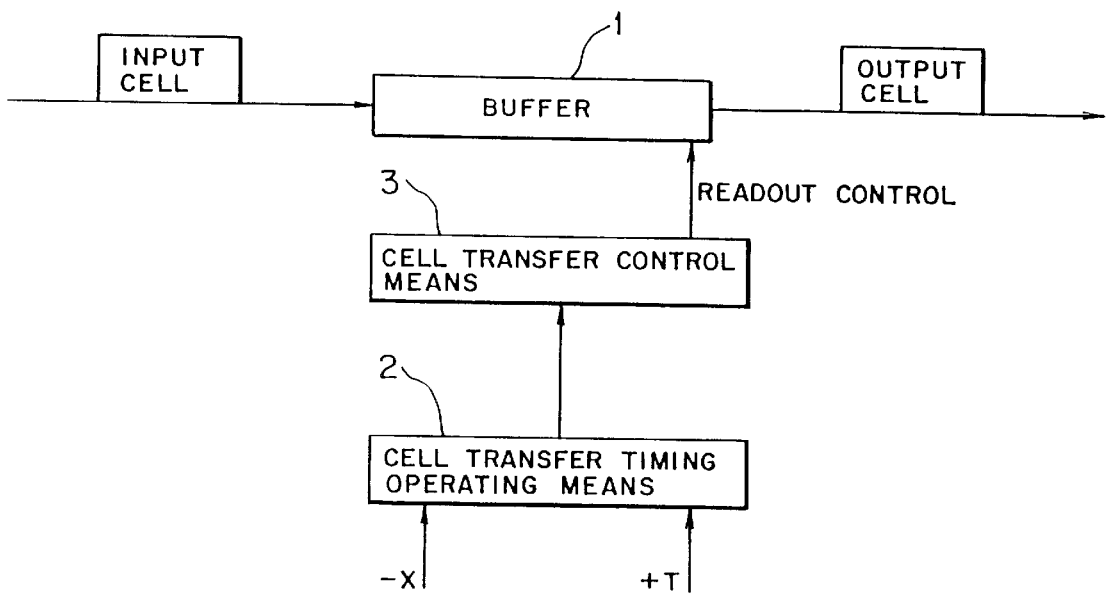
FIG. 1 is a block diagram explaining an aspect of the present invention.

Referring to the attached drawings, explanation will be made below-as for a device embodying the cell transfer control method according to the present invention. FIG. 1 is a block diagram showing the cell transfer control device according to the present invention.

Referring to FIG. 1, the transfer control buffer 1 stores temporarily cells.

The cell transfer timing operating means 2 performs a desired operation to determine the cell transfer time, using a first parameter T set to a desired value and a second parameter X set to a value less than the first parameter T and indicating information caused by one cell processing time.

The cell transfer control means 3 controls the transfer timing of a cell from the buffer 1 to perform a cell transfer control at a peak rate of X/T with respect to the ATM unit processing rate, based on the calculation result from the cell transfer timing operating means 2.

In this case, the cell transfer timing operating means 2 adds the first parameter T to a count parameter C at a cell transfer time while it subtracts the second parameter X from the count parameter C. When the count parameter C becomes smaller than the second parameter X, information is sent to the cell transfer control means to transfer the next cell.

The cell transfer timing operating means 2 calculates a transferable time of the next cell and the count parameter C at the transferable time, based on the count parameter C at the previous cell transfer time, when a cell is transferred from the buffer 1. Where a cell cannot be transferred at the next cell transferable time, the cell transfer timing operating means 2 includes means that resets the count parameter C to an initial value when a cell is transferred from the buffer 1.

Moreover, the cell transfer timing operating means 2 calculate a transferable time of the next cell and the count parameter C at the transferable time, based on the count parameter C at the previous cell transfer time, when a cell is written into the buffer 1. Where a cell cannot be sent at the next cell transferable time, the cell transfer timing operating means 2 includes means that resets the count parameter C to an initial value when a cell is written into the buffer 1.

The cell transfer timing operating means 2 includes memory means that sets respectively the first parameter T and the second parameter X to at least one piece of virtual path information and/or at least one piece of virtual channel information, and operating means that performs a desired operation to calculate a cell transfer time, using the first parameter T stored in the memory means, the second parameter X, and a count parameter C.

According to the present invention, as depicted in FIG. 1, a cell which is temporarily stored in the transfer control buffer 1 is transferred at a predetermined timing, in response to an instruction from the cell transfer control means 3. However, in order to transfer the cell, the cell transfer timing operating means 2 performs a desired operation to obtain a cell transfer timing, using the first parameter T set to a desired value and the second parameter X set to a value smaller than the first parameter T and indicating information caused by one processing time. Then the cell transfer control means 3 controls the timing at which the cell is transferred from the buffer 1 to perform a cell transfer control at a peak rate of X/T with respect to the device processing speed, based on the calculation result from the cell transfer timing operating means 2.

In this case, the first parameter T is added to a count parameter C at a cell transfer time while the second parameter X is subtracted from the count parameter C every time one cell processing time passes. When the count parameter C becomes smaller than the second parameter X, information is output to the cell transfer control means to transfer the next cell.

When the buffer 1 transfers cell, the transferable time of the next cell and the count parameter C at the transferable time may be calculated based on the count parameter C at the previous cell transfer time. Moreover, where a next cell cannot be transferred at the next cell transferable time, the count parameter C may be reset to its initial value "0" just before a cell is sent out from the buffer 1.

Furthermore, when a cell is written into the buffer 1, the transferable time of the next cell and the parameter at the transferable time may be calculated based on the parameter at the previous cell transfer time. Moreover, where a next cell cannot be sent at the next cell transferable time, the parameter may be reset to its initial value "0" just before a cell is written into the buffer 1.

As to at least one piece of virtual path information and/or at least one piece of virtual channel information, the first parameter T and the second parameter X are set respectively to the memory means. The operating means may perform a desired operation, using the first parameter T, the second parameter X, and a count parameter C stored in the memory means, to obtain a cell transfer time.

The value which has information regarding the ratio of the device processing speed to the minimum exchange unit speed may be used as the first parameter T. Moreover, the value which has time frame information may be used as the first parameter T and the value which has information regarding the number of cells which are transferred between time frames may be used as the second parameter X.

According to the present invention, a predetermined operation is performed using the first parameter T set to a desired value and the second parameter X set to a value smaller than the first parameter T and having information caused by one cell processing time to calculate a cell transfer time so that a cell transfer control is performed at a peak rate of X/T with respect to the device processing speed. There is an advantage in that controlling the speed at regular intervals facilitates the range control, thus enabling a fine control according to the information speed.

The first parameter T is added to a count parameter C at a cell transfer time while the second parameter X is subtracted from the count parameter C every time one cell processing time passes. When the count parameter C becomes smaller than the second parameter X, a cell transfer control is performed to transfer the next cell. Thus controlling the speed at regular intervals makes easy the range control easier. As a result, a fine control can be performed according to the information speed.

Moreover, when a cell is transferred from the cell transfer control buffer or is written into the cell transfer control buffer, the next cell transferable time and the parameter at the transferable time can be calculated based on the count parameter C at the previous cell transfer time, whereby a cell transfer control can be performed at a peak rate of X/T. Hence, there is an advantage in that a fine control can be established according to the information speed. Moreover, a cell transfer control can be realized using simplified means.

Where the next cell cannot be transferred at the transferable time, the count parameter C is reset to its initial value "0" just before a cell is transferred out from the cell transfer buffer or written into the cell transfer control buffer. Hence, even when the cell transfer interval is out of the peak rate, a fine control can be performed according to the information speed.

Furthermore, with the first parameter T and the second parameter X set respectively to at least one piece of virtual path information and/or at least one piece of virtual channel information, a desired operation is performed to calculate a cell transfer time, using the first parameter T, the second parameter X, and a count parameter C. A cell transfer control is performed respectively to the virtual path information and the virtual channel information at a peak rate of X/T with respect to the device processing rate so that a fine control can be performed according to the information speed. In addition, the peak rate setting can be controlled respectively to each virtual path information and each virtual channel information, in no relation to other virtual path information and other virtual channel information. Hence, it is possible to utilize effectively the statistical multiplexing effect.

The parameter can be suitably set by setting as the first parameter T either a value which has a ratio of the device processing speed to the minimum exchange unit speed or a value which has time frame information, and by setting as the second parameter X a value which has the number of cells to be sent between time frames.

Moreover, the embodiment according to the present invention will be described below with reference to the drawings.

(b) Explanation of First Embodiment

Figure 2:
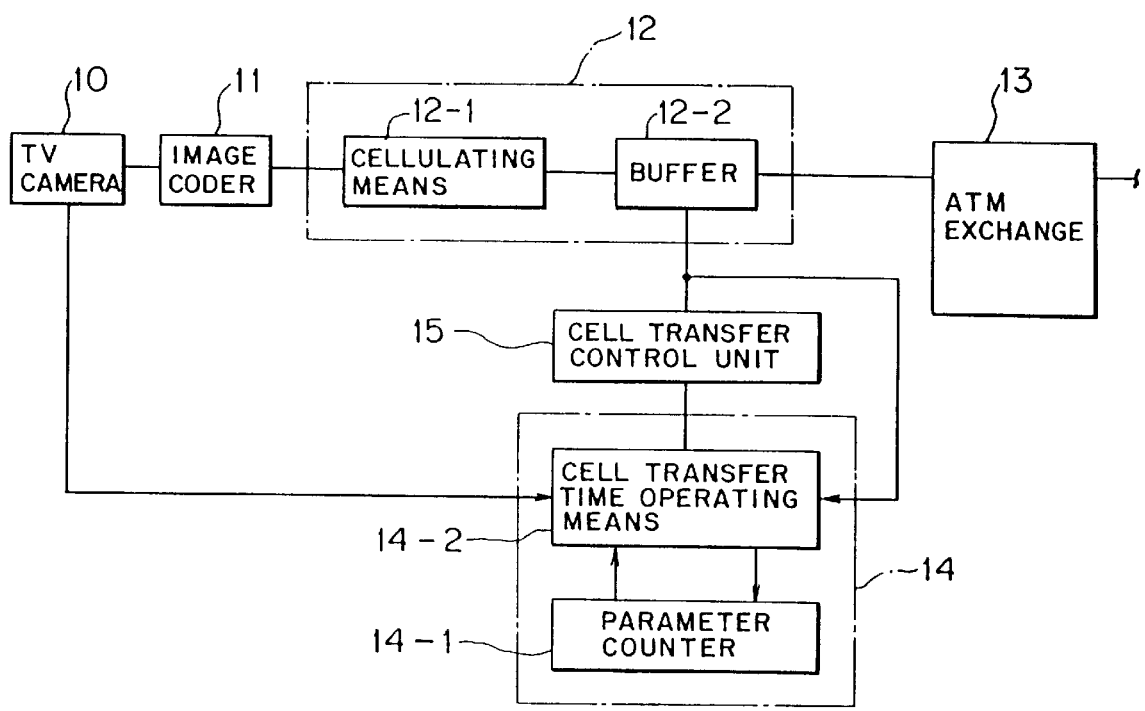
FIG. 2 is a block diagram showing the entire configuration of the first embodiment according to the present invention.

FIG. 2 is a block diagram showing the first embodiment according to the present invention. As illustrated in FIG. 2, a cell assembling unit 12 is connected to a television camera (transmission terminal) 10 via an image coder 11. An ATM exchange 13 is connected to the cell assembling unit 12. The assembling unit 12 is arranged to each input highway of the ATM exchange 13. Hence this means that the assembling unit 12 is arranged to each virtual channel (VC).

The image coder 11 encodes compressively television image signals from the television camera 10 to form a compact coded cell of variable length.

The cell assembling unit 12 cellulates the signal encoded with the image coder 11 and then transmits the resultant cell to the ATM exchange 13. The cell assembling unit 12 includes cellulating means 12-1 that cellulates signals encoded with the image coder 11, and a cell transfer control buffer 12-2 (such as a FIFO memory or RIFO memory) that stores temporarily the cells from the cellulating means 12-2 and holds the same till the transferable time comes.

In most cases, the assembling unit 12 is paired with a cell decellulating unit that performs a decellulating operation. The combined system is called a cell assembling and disassembling (CLAD) unit.

The ATM exchange 13 subjects a cell (or a cell with a fixed length formed of logical channel information and data information) sent from the cell buffer 12-2 to an exchange process.

In order to control cells transferred from the cell-buffer 12-2, the cell transfer control device includes the cell transfer timing operating unit 14 and the cell transfer control unit 15.

The cell transfer timing operating unit 14 performs a desired operation to calculate the cell transfer timing, using the first parameter T and the second parameter X ($\leq$T) set to a value smaller than the first parameter T and having information caused by one cell processing time. The cell transfer timing operating unit 14 includes the parameter counter 14-1 and the cell transfer timing operating unit 14-2.

In this case, a value having time frame information is set as the first parameter T and a value having information about the number of cells to be sent during the period between time frames is set as the second parameter X. In concrete, because a television image is formed of 30 frames per second, a value which is obtained by normalizing 1/30 seconds by one cell processing time Y is set as the parameter T. The number of one frame forming cells is set as the parameter X.

Figure 3:
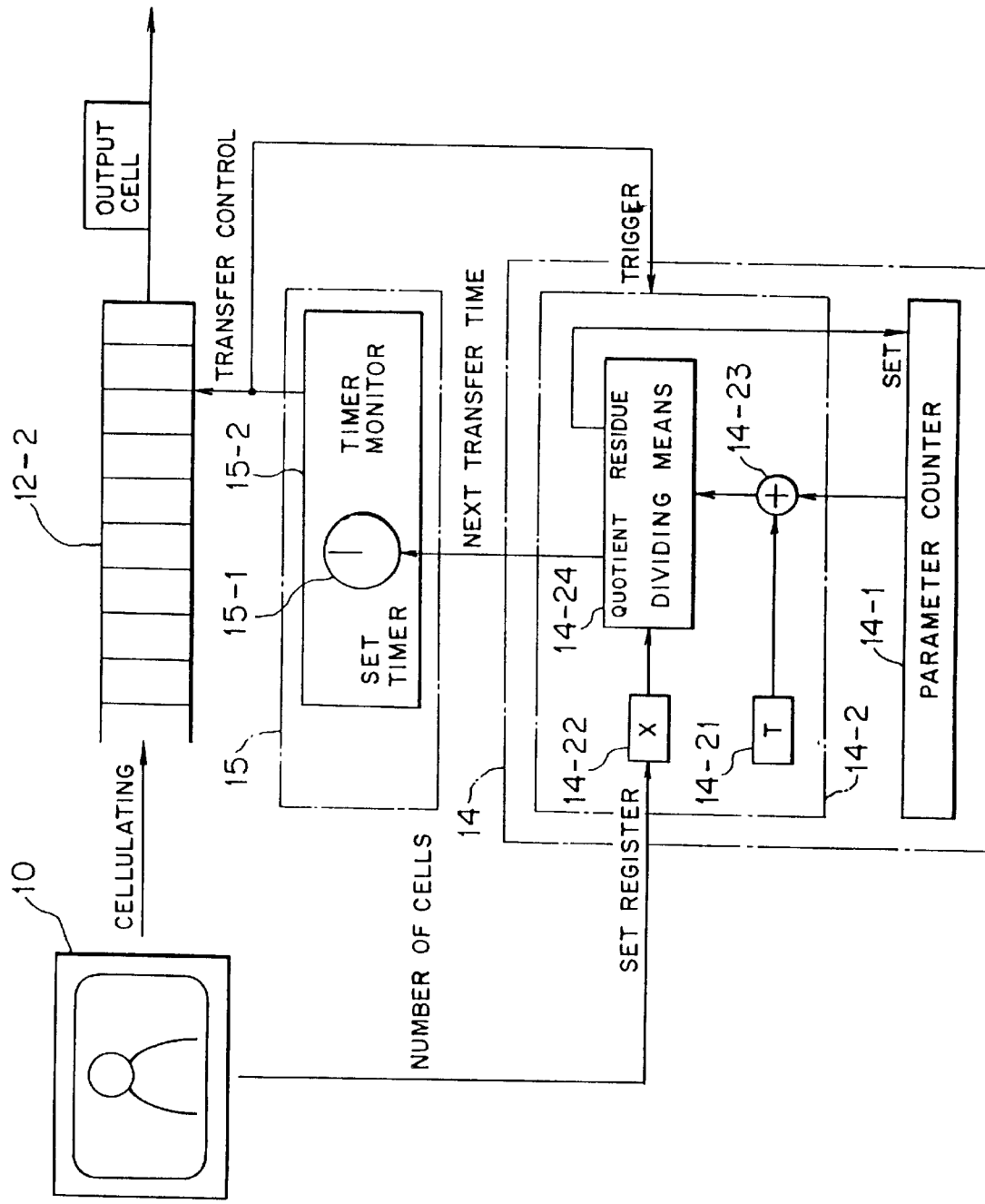
FIG. 3 is a block diagram showing the main portion of the first embodiment according to the present invention.

The cell transfer timing operating means 14-2, shown in FIG. 3, is formed of the register 14-21 that sets the first parameter T, the register 14-22 that sets the number of cells (second parameter) X forming one frame sent from the television camera 10, the adding means 14-23 that adds the parameter T from the register 14-21 to the value from the parameter counter 14-1, and the dividing means 14-24 that divides the value from the adding means 14-23 by the register 14-22 to obtain the quotient and the residue.

The dividing means 14-24 outputs the signal with quotient information as the next cell transfer time information to the cell transfer control unit 15. The dividing means 14-24 also outputs the residue information as counter updating information to the parameter counter 14-1.

In this case, the timing at which the dividing means 14-24 transmits a signal having the quotient information and a signal having the residue information is the time when a cell is transmitted from the cell buffer 12-2 (to be described later). The timing may be the time when a cell is written into the cell buffer 12-2.

The parameter counter 14-1 is set to "0" at the time when the cell of frame data is transferred. The count value is updated by the residue information issued from the dividing means 14-24. The adding means 14-23 in the cell transfer time operating means 14-2 receives the count value from the parameter counter 14-1 and then adds the same to the first parameter T.

Where a cell cannot be transferred at the next cell transferable time (not shown in FIG. 3), the parameter counter may be reset to its initial value "0" just before the cell is transferred out of the cell buffer 12-2 or is written into the cell buffer 12-2. In t his case, initializing means which includes initial value setting means and a selector are arranged between the adding means 14-23 and the parameter counter 14-1, like the configurations shown in FIGS. 5 and 7 as will be explained later.

The cell transfer control unit 15 controls the timing at which the cell buffer 12-2 transfers cells to perform a cell transfer control at a peak rate of X/TY with respect to the processing rate of the ATM unit 13, based on the calculation result from the cell transfer timing operating means 14. The cell transfer control unit 15 includes the timer 15-1 and the timer monitor 15-2. The next cell transfer time from the cell transfer timing operating unit 14 is monitored by means of the timer 15-1 and the timer monitor 15-2. When the next transfer time comes, a cell is sent to the cell buffer 12-2.

The fact that the cell transfer timing operating means 14 has received a cell is notified at the cell transfer time. When a cell is sent out of the cell buffer 12-2, the cell transfer timing operating unit 14 calculates the next cell transferable time and the parameter counter at the transferable time, based on the parameter counter at the previous cell transfer time.

The cell transfer timing operating unit 14 may be formed so as to obtain the next cell transferable time and the parameter counter at the transferable time, based on the parameter counter at the previous cell transfer time, when a cell is written to the cell buffer 12-2.

Figure 4:
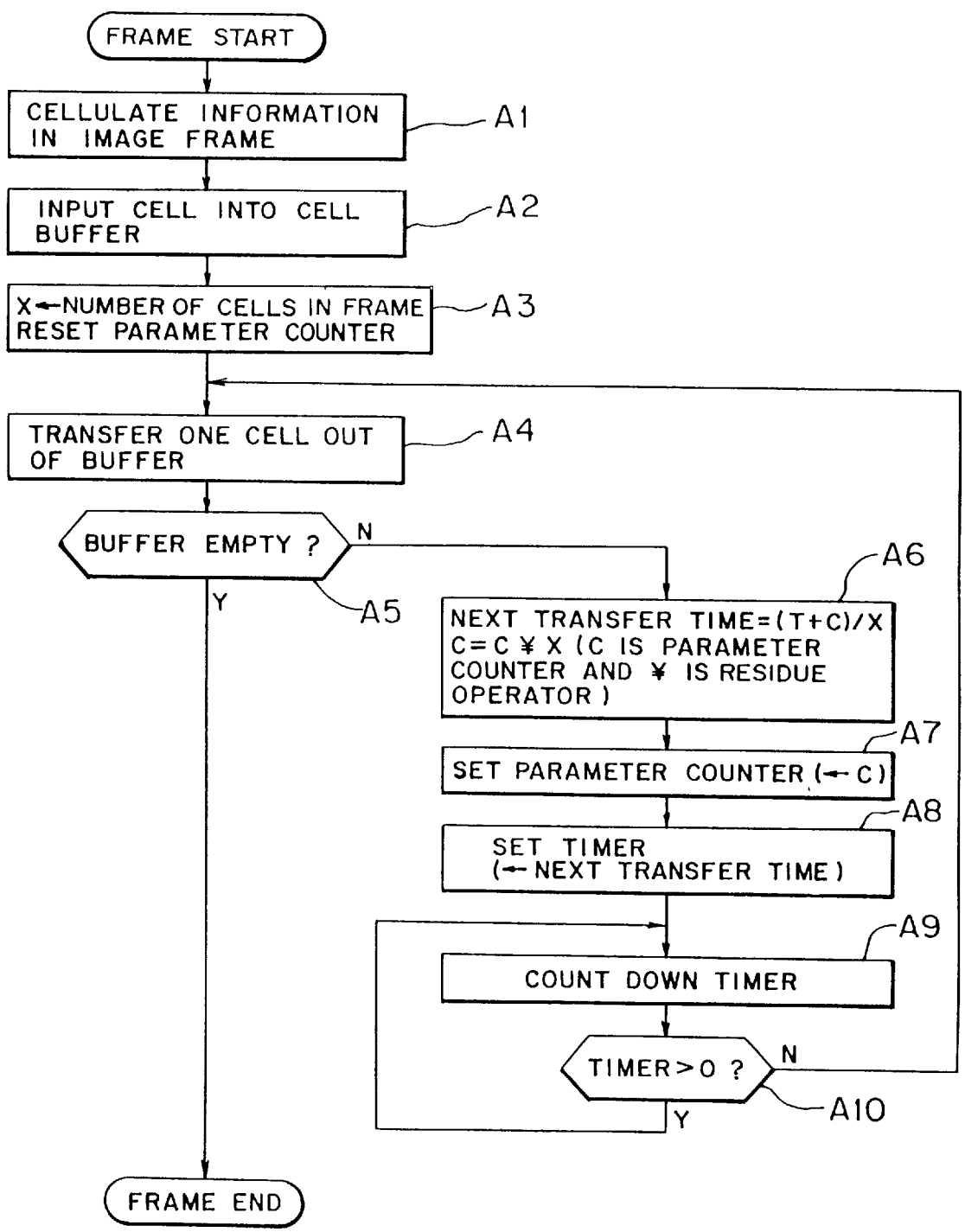
FIG. 4 is a flowchart explaining the operation of the first embodiment of the present invention.

The function of the configuration of the present embodiment will be described below with reference to FIG. 4. First, a compressively-encoded cell of a current television image (an image frame information cellulating process: step A1) is temporarily stored into the cell buffer 12-2 (step A2). The cell buffer 12-2 transmits the cell at a suitable timing. However, in this case, the cell buffer 12-2 controls the cell transfer as follows:

The television image is formed of 30 frames per second. The parameter T is previously set to the register 14-21 to an up value at the cell transfer time as a value obtained by normalizing 1/30 seconds by one cell processing time Y.

The image coder 11 encodes image data and then the resultant data is cellulated. The cell buffer 12-2 receives the resultant image data for one frame (step A2) while the register 14-22 sets the number X of the cells forming one frame (step F). The parameter counter 14-1 is set to "0" when the cell of the frame data is transferred (step A3).

When the cell transfer control unit 15 makes the cell buffer 12-2 to transfer the first cell, the cell transfer time operating means 14-2 notifies the parameter counter 14-1 of the residue information obtained by dividing (TY+the value from the parameter counter 14-1) by X. Thus the value from the parameter counter 14-1 is updated. At the same time, the quotient information, obtained by dividing by means of the cell transfer time operating means 14-2, is notified the cell transfer control unit 15 as the next transfer time.

The cell transfer control unit 15 controls the transfer of the next cell from the cell buffer 12-2 after the cell transfer time operating means 14-2 has notified of residue information. The cell transfer time operating means 14-2 notifies the next transfer time and the parameter at the transfer time.

That is, the register 14-22 is set to the parameter X and the parameter counter 14-1 is reset (step A3). Then when the cell buffer 12-2 sends image data for one frame in the step A4, it is decided whether the cell buffer 12-2 is empty in the step A5. If not empty, both the next transfer time and the residue can be obtained by calculating (TY+C)/X (where C is a parameter count value) in the step A6. The residue information is the update value from the parameter counter 14-1 in the step A7.

As described above, when the next cell cannot be transferred at the cell transferable time, the parameter is reset to an initial value "0". In this case, the step A6 is performed to obtain the next transfer time from TY/X and the residue.

Thereafter, the timer 15-1 in the cell transfer control unit 15 is set to start its count-down operation. When the timer 15-1 counts "0", the cell buffer 12-2 transfers the next cell (steps A7 to A10 and A4).

Thereafter, when the cell buffer 12-2 is in an empty state, the flow is ended via the No route in the step A5.

When the next frame comes, the steps similar to the above-described steps are repeated. As described above, the above-described procedure allows the speed to be controlled at equal intervals, thus facilitating the range management so that a fine control can be performed according to the information speed.

(c) Explanation of Second Embodiment

Figure 5:
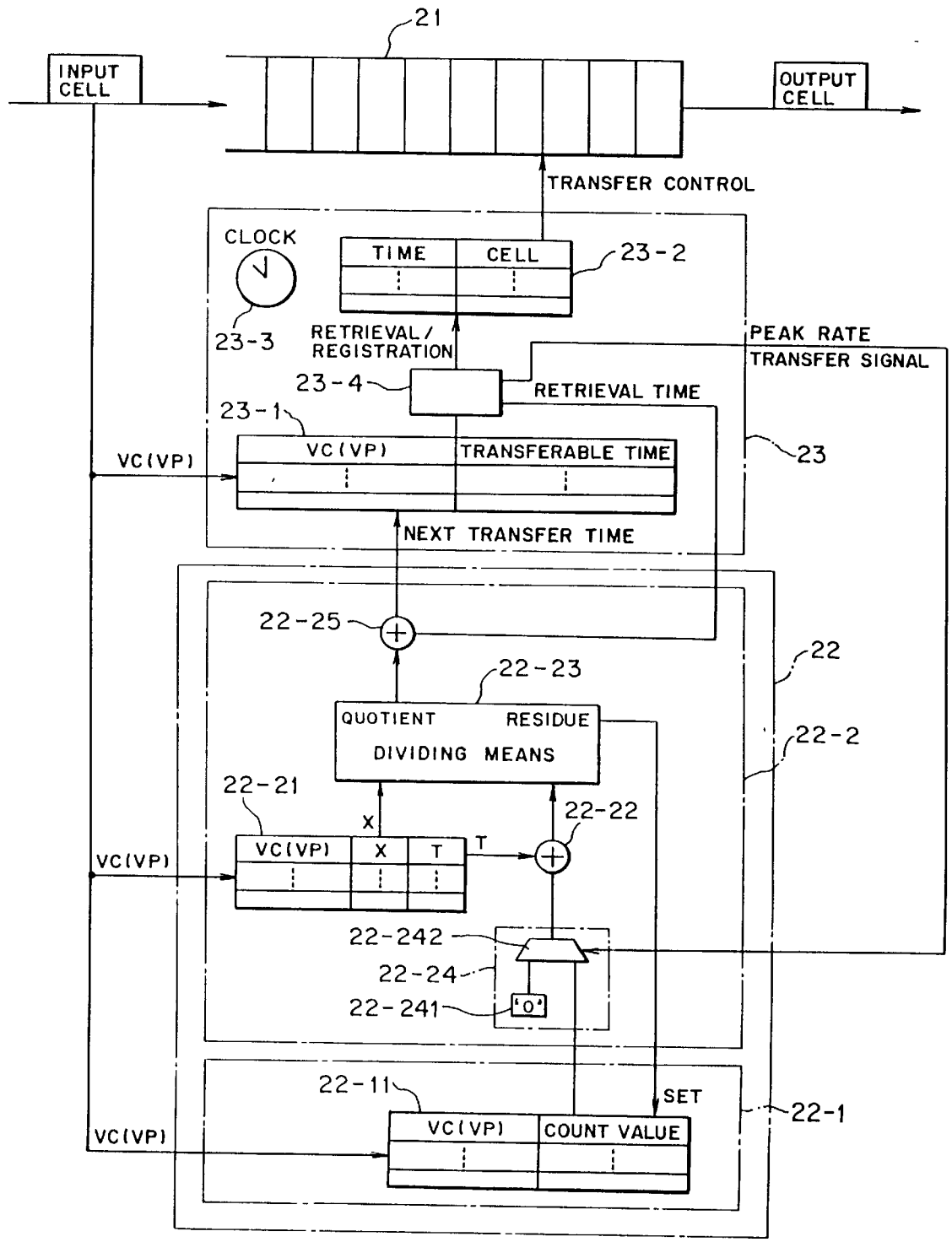
FIG. 5 is a block diagram showing the main portion of the second embodiment according to the present invention.

FIG. 5 is a block diagram showing the second embodiment according to the present invention. In the second embodiment shown in FIG. 5, the cell buffer 21 is arranged in the ATM exchange. RIFO memories and FIFO memories, for example, are used as the cell buffer 21. The transmitting terminal, the cellulating means (not limited to the television camera in the above embodiment), and cell-receiving means are omitted in FIG. 5.

In order to control the cell transfer from the cell buffer 21, the cell transfer control device includes the cell transfer timing operating unit 22 and the cell transfer control unit 23.

The cell transfer timing operating unit 22 sets the first parameter T' and the second parameter X'(≦T') set to a value smaller than the first parameter T' and having information caused by one cell processing time, according to the virtual channel (VC) or virtual path (VP), and performs a desired operation to calculate a cell transfer time, using the first parameter T' and the second parameter X'. The cell transfer timing operating unit 22 includes the parameter counter 22-1 and the cell transfer timing operating means 22-2.

In this case, the value having information regarding the ratio of the device processing rate V to the minimum exchange unit rate of the ATM exchange is set as the first parameter T' according to VC or VP. A natural number is set as the parameter X'. For example, if a VP or VC range corresponds to the minimum exchange rate, the parameter X' is set to "1". If another VP or VC range corresponds to n-times the minimum exchange unit rate, the parameter X' is set to "n". That is, a peak rate is set to the parameter X'.

The cell transfer timing operating means 22-2 consists of a table 22-21 used to set the first parameter T' and the second parameter X' for VC (or VP); adding means 22-22 that adds the parameter T' from the table 22-21 to the value from the parameter counter 22-21; dividing means 22-23 that divides the value from the adding means 22-22 by the parameter T from the table 22-21 to obtain the quotient and the residue; initializing means 22-24 that resets the parameter to its initial value "0" when the next cell cannot be transferred at the cell transferable time, or the cell transfer interval is out of the peak rate; and adding means 22-25 that adds the quotient information from the dividing means 22-23 to the retrieval time set by the retrieving and registering means 23-4 within the cell transfer control unit.

The initializing means 22-24 includes the initial value setting means 22-241 and the selector 22-242. The selector 22-242 selects the initial value from the initial value setting means 22-241 when the cell transfer interval is out of the peak rate, or selects the count value from the parameter counter 22-1 when the cell transfer interval is at the peak rate.

When the cell transfer interval is out of the peak rate, the dividing means 22-23 performs the T'/X' operation. When the cell transfer interval is at the peak rate, the dividing means 22-23 performs the (T'+C)/X') operation, where C is a parameter count value.

The dividing means 22-23 transfers a signal having the residue information acting as information regarding the next cell transfer time to the cell transfer control unit 23 via the adding means 22-25. The dividing means 22-23 also transfers a signal having the residue information acting as counter updating information to the parameter counter 22-1.

In this case, the dividing means 22-23 transfers a signal having the quotient information and a signal having the residue information when a cell is written to the cell buffer 21 (to be described later). However, the transfer timing may be at the time when the cell buffer 12-2 transfers a cell. If the time when the cell buffer 12-2 transfers a cell is defined as a reference time, the initializing means 22-24 initializes the parameter at the cell transfer time of the cell buffer 12-2.

The parameter counter 22-1 is set to "0" at the cell transfer starting time. In response to the residue information from the dividing means 21-23, the count value C is updated. However, the parameter counter 22-1 includes the table 22-11 which holds the count value C of each VC (or VP). In other words, when a cell transfer time of a VC (or VP) is calculated, the count value C of the corresponding VC (or VP) is updated in the table 22-1.

The parameter counter 22-1 inputs the count value C of the corresponding VC (or VP) to the adding means 22-22 within the cell transfer time operating means 22-2 via the selector 22-242. The adding means 22-22 adds the count value C with the first parameter T'. If the cell transfer interval is out of the peak rate, the initializing means 22-24 does not allow the parameter counter 22-1 to be output, but outputs "0" to the adding means 22-22.

Moreover, in order to perform the cell transfer control at a peak rate of X'/T' with respect to the processing speed of the ATM equipment, the cell transfer control unit 23 controls the timing at which the cell buffer 21 transfers a cell, based on the calculation result from the cell transfer timing operating unit 22. The cell transfer control unit 23 includes the tables 23-1 and 23-2, the clock 23-3, and the retrieving and registering means 23-4.

The table 23-1 is used to set each VC (or VP) to the transferable time (readable time). The next transfer time is updated sequentially according to the output from the cell transfer time operating means 22-2.

The table 23-2 is used to register cells at retrieval time intervals.

The retrieving and registering means 23-4 compares the transferable time selected from the table 23-1 with a current time. If the transferable time is earlier than the current time, it is set as a retrieval time. If the current time is later than the transferable time, it is set as a retrieval time. If the table 23-2 includes the cell registered at the retrieval time, the incremented retrieval time is set as a new retrieval time while the cell is registered in the table 23-2 at the retrieval time. The retrieval time information also is input to the adding means 22-25 within the cell transfer time operating means 22-2.

As described above, the time (readable time) for each cell is registered in the table 23-2. Hence the cell buffer 21 can output the cell registered as the current time.

The cell transfer timing operating unit 22 is informed of the updating time of the table 23-2, or the cell writing time to the cell buffer 21. When a cell is written to the cell buffer 21, the cell transfer timing operating unit 22 calculates the next cell transferable time and the parameter at the transferable time, based on the parameter at the previous cell transfer time. In this case, the cell transferable time and the parameter can be obtained for each VC (or VP).

The cell transfer timing operating unit 22 may be formed so as to obtain the next cell transferable time and the parameter at the transferable time, based on the previous cell transfer time, when a cell is transferred to the cell buffer 21.

In the second embodiment, a transferable time corresponding to the VC (or VP) of an input cell stored in the cell transfer control unit 23 is read out at the cell inputting time and then is compared with the current time. If the transferable time is less than the current time (or current time <transferable time) and there are no cells to be transferred at the transferable time stored in the cell transfer control unit 23, the cell transfer control unit 23 informs the cell transfer timing operating means 22-2 that the transfer cell is transferred at a peak rate. In other cases, the cell transfer control unit 23 informs the cell transfer timing operating means 22-2 that the cell transfer interval is out of the peak rate.

When the cell transfer control unit 23 judges that the cell transfer interval is transferred at the peak rate, the cell transfer timing operating means 22-2 divides (the parameter count value C from the parameter counter 22-1+the first parameter T') by the second parameter X'.

When the cell transfer control unit 23 judges that the cell transfer interval is out of the peak rate, the initializing means 22-24 is activated to divide the first parameter T' by the second parameter X';

In either case, the residue is registered as a new parameter in the parameter counter 22-1.

The sum of the quotient and the retrieval time is registered as the next transferable time to the cell transfer control unit 23.

In such a manner, it is possible to set the transfer interval of the next coming cell to the peak rate or more.

Figure 6:
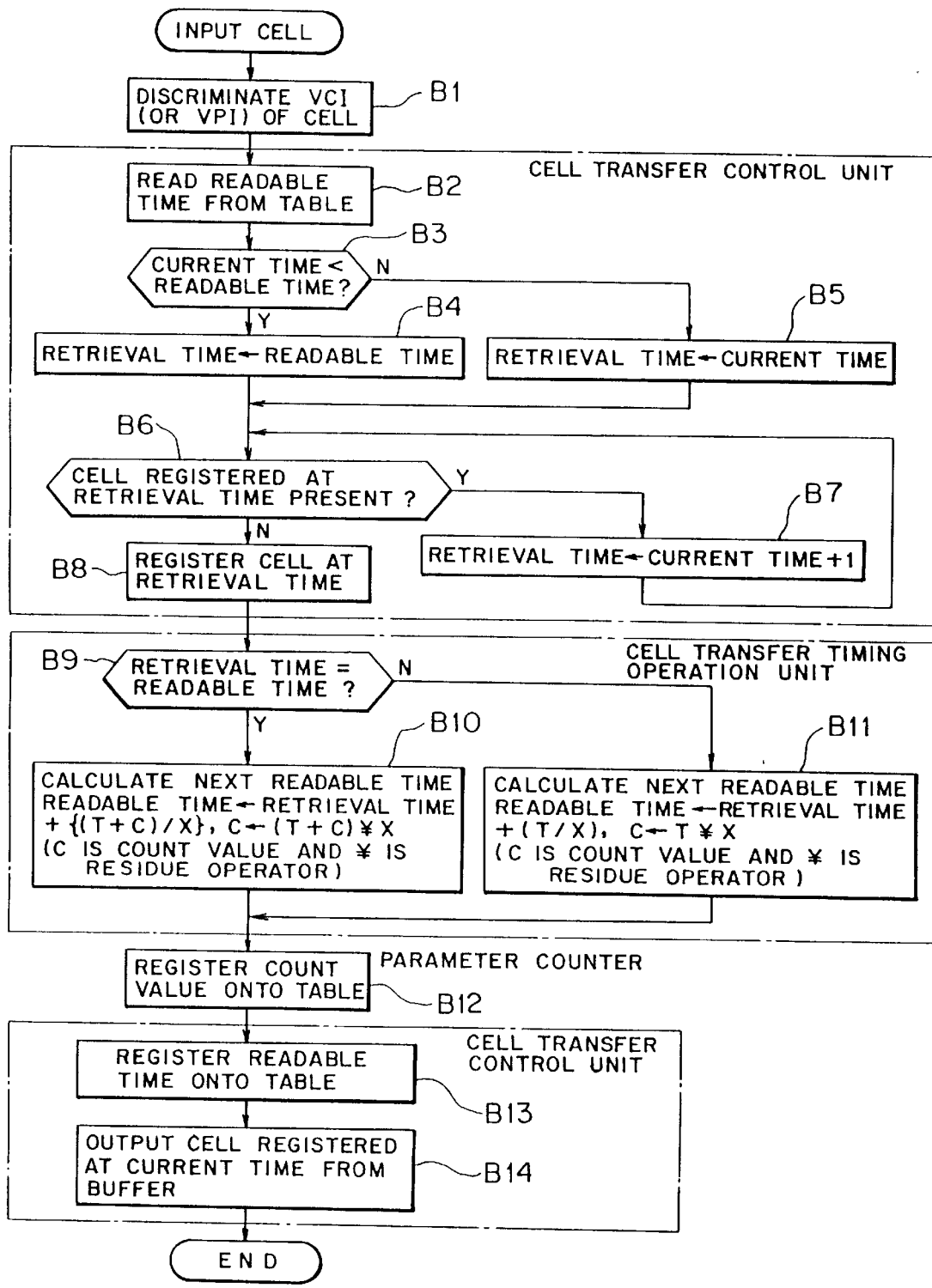
FIG. 6 is a flowchart explaining the operation of the second embodiment of the present invention.

Furthermore, the operation of the second embodiment will be described below with reference to FIG. 6.

When a cell is input, the virtual channel information (VCI) (or the virtual path identification information (VPI)) of the cell is discriminated (step B1). The cell transfer control unit 23 reads the readable time out of the table 23-2 (step B2). Next, the readable time is compared with the current time in the step B3. If the readable time is less than the current time, it is set as a retrieval time (step B4). If the current time is less than the readable time, it is set as a retrieval time (step B5). Such an operation is performed by means of the retrieving and registering means 23-4.

Thereafter, it is decided in the step B6 whether there is a cell registered as a retrieval time. If yes, the retrieval time is incremented by 1 in the step B7. Then the flow goes back to the step B6 to decide whether there is a cell registered as the retrieval time. If no, the cell is registered as a retrieval time in the table 23-2 in the step B8. The retrieving and registering unit 23-4 performs the above operation.

Thereafter, the cell transfer timing operating means 22-2 decides whether a cell has been transferred at a peak rate, or the retrieval time coincides with the readable time (transferable time) (step B9). If the retrieval time coincides with the readable time, the next readable time is calculated in the following manner in the step B10. That is, when a cell is transferred at a peak rate, (retrieval time+[(T'+C)/X'])V regards as the next readable time, where C is a parameter count value.

When the cell is not transferred at the peak rate, the parameter count value is reset in the step B11 to regard the [(retrieval time+(T'/X')] as the next readable time.

Thereafter, the count value is updated by registering a new count value in the table 22-11 prepared in the parameter counter 22-1 (step B12).

The cell transfer control unit 23 registers the readable time to the table 23-2 and produces the cell registered as the current time from the cell buffer 21 (steps B13 and B14).

In the second embodiment, where VP or VC is differently multiplexed, the next cell transferable time is evaluated only at the cell buffer inputting or outputting time. Hence it is unnecessary to subtract the parameter X' from each VP or VC in each processing time. Hence when there are no cells which can be transferred to all VPs or VCs of the device, cells are transferred to other VPs and VCs so that the output highway can be effectively utilized.

In other words, since the peak rate for each VC (or VP) is set independently to other VC (or VP) setting values, the statistical multiplexing effect can be effectively utilized. In addition, controlling the speed at regular intervals allows an easy range management. As a result, a fine control can be performed according to the information speed.

(d) Explanation of Third Embodiment

Figure 7:
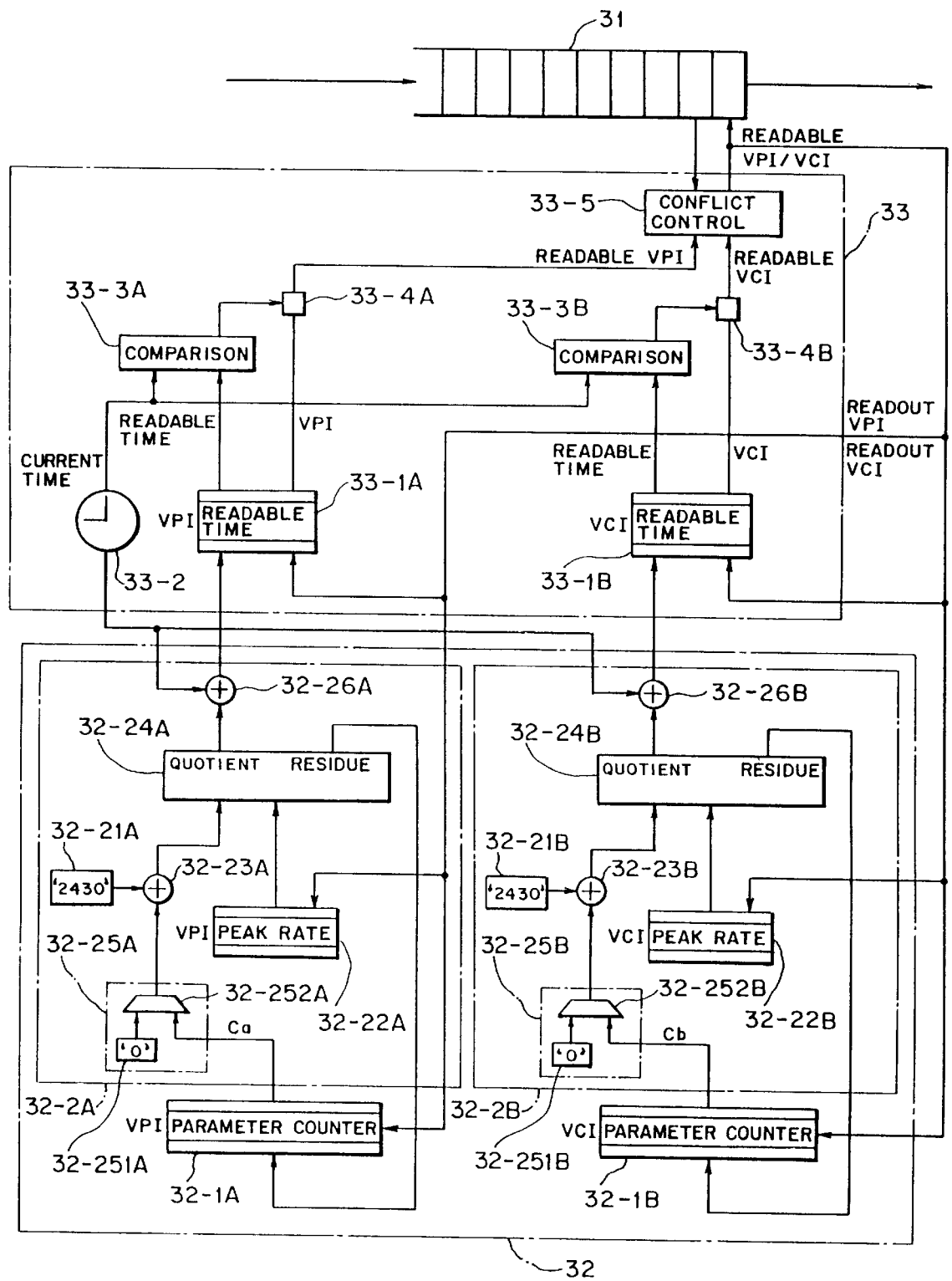
FIG. 7 is a block diagram showing the main portion of the third embodiment according to the present invention.

FIG. 7 is a block diagram showing the third embodiment according to the present invention. In the embodiment illustrated in FIG. 7, the cell buffer 31 is arranged in the ATM exchange. RIFO memories or FIFO memories, for example, can be used as the cell buffer 31. The transmitting terminals (not limited to the television camera in the embodiment shown in FIG. 7), the cellulating means, and the cell receiving means are omitted in FIG. 7.

The cell transfer timing operating unit 32 and the cell transfer control unit 33 are arranged to control the cells sent from the cell buffer 31.

The cell transfer timing operating unit 32 sets the first parameter T and the second parameter X ($\leq$T) set to a value smaller than the first parameter T and having information caused by one-cell processing time. The cell transfer timing operating unit 32 also performs a desired operation to obtain a cell transfer time for each virtual channel (VC) and virtual path (VP), using the first parameter T and the second parameter X. The cell transfer timing operating unit 32 includes the parameter counter 32-1A and the cell transfer time operating means 32-2A, which are used for virtual path (VP); and the parameter counter 32-1B and the cell transfer time operating means 32-2B, which are used for virtual channel (VC). The second parameter X is set according to VC and VP.

In this case, the value (2430) having information regarding the ratio of the device processing rate (e.g. 150 Mbps) to the minimum exchange unit rate (64 Kbps) of the ATM exchange is set as the first parameter T. A desired natural number is set as the second parameter X to each of VP and VC. For example, if a VP or VC range corresponds to the minimum exchange unit rate, "1" is set as the second parameter X. If the range of another VP or VC is n-times the minimum exchange unit rate, "n" is set as the second parameter X. The peak rate is set as the second parameter X.

The cell transfer timing operating means 32-2A consists of the register 32-21A which sets the first parameter T; the table 32-22A which sets the second parameter X (peak rate) to each VP; adding means 32-23A which adds the first parameter T to the value from the parameter counter 32-1A; dividing means 32-24A which divides the value from the adding means 32-23A by the first parameter T (2430) to obtain the quotient and the residue; initializing means 32-25A which resets the parameter counter to an initial value at the next cell transfer time of the cell buffer 31 when a cell cannot be transferred at the next cell transferable time or the cell transfer interval is out of a peak rate; and adding means 32-26A which adds the quotient information from the dividing means 32-24A to the current time from the clock 33-2 in the cell transfer control unit 33.

The cell transfer timing operating means 32-2B consists of the register 32-21B which sets the first parameter T; the table 32-22B which sets the second parameter X (peak rate) to each VC; adding means 32-23B which adds the first parameter T to the value from the parameter counter 32-1B; dividing means 32-24B which divides the value from the adding means 32-23B by the first parameter T (2430) to obtain the quotient and the residue; initializing means 32-25B which resets the parameter counter to an initial value at the next cell transfer time of the cell buffer 31 when a cell cannot be transferred at the next cell transferable time or the cell transfer interval is out of a peak rate; and adding means 32-26B which adds the quotient information from the dividing means 32-24B to the current time from the clock 33-2 in the cell transfer control unit 33.

The initializing means 32-25A includes the initial value setting means 32-251A and the selector 32-252A. The initializing means 32-25B includes the initial value setting means 32-251B and the selector 32-252B. The selector 32-252A selects the initial value from the initial value setting means 32-251A when the cell transfer interval is out of the peak rate. The selector 32-252B selects the initial value from the initial value setting means 32-251B when the cell transfer interval is out of the peak rate. If the cell transfer interval is not out of the peak rate, the selector 32-252A selects the count value from the parameter counter 32-1A and the selector 32-252B selects the count value from the parameter counter 32-1B.

The dividing means 32-24A transfers a signal with quotient information as the next cell transfer time information to the cell transfer control unit 33 via the adding means 32-26A. The dividing means 32-24B transfers a signal with quotient information as the next cell transfer time information to the cell transfer control unit 33 via the adding means 32-26B. The dividing means 32-24A transmits a signal having the residue information as counter updating information to the parameter counter 32-1A. The dividing means 32-24B transmits a signal having the residue information as counter updating information to the parameter counter 32-1B.

In this case, the timing at which the dividing means 32-24A transmits a signal having quotient information and a signal having residue information corresponds to the cell transfer timing of the cell buffer 31 (as described later). However, the timing may be the writing time to the cell buffer 31. If it is assumed that the reference time regards as the time at which a cell is transferred out of the cell buffer 31 or written to the cell buffer 31, the initializing means 32-24 initializes the parameter when a cell is transferred out of the cell buffer 31 or written into the cell buffer 31.

The parameter counter 32-1A and 32-1B are set to "0" at the cell transfer starting time. The parameter counter 32-1A updates its count value in response to the residue information from the dividing means 32-24A. The parameter counter 32-1B updates its count value in response to the residue information from the dividing means 32-24B. The parameter counter 32-1A includes a table which holds count values for VPs (not shown).

The parameter counter 32-1B includes a table which holds count values for VCs (not shown). When a cell transfer time is calculated for a VP and a VC, the parameter counter 32-1A updates the count value corresponding to the VP on the table while the parameter counter 32-1B updates the count value corresponding to the VC in the table.

The parameter counter 32-1A inputs its count value corresponding to VP to the adding means 32-23A in the cell transfer time operating means 32-2A via the selector 32-252A to add the same to the first parameter T. The parameter counter 32-1B inputs its count value corresponding to VC to the adding means 32-23B in the cell transfer time operating means 32-2B via the selector 32-252B to add the same to the first parameter T. When the cell transfer interval is out of the peak rate, the initializing means 32-25A stops the parameter counter 32-1A from sending its output, thus resetting the parameter to the initial value. When the cell transfer interval is out of the peak rate, the initializing means 32-25B stops the parameter counter 32-1B from sending its output, thus resetting the parameter to the initial value.

Moreover, the cell transfer control unit 33 controls the cell transfer timing of the cell buffer 31, based on the result calculated by means of the cell transfer timing operating means 32, to perform the cell transfer control at a peak rate of X/T with respect to the processing rate of the ATM equipment. The cell transfer control unit 33 includes the VP readable time setting table 33-1A, the VC readable time setting table 33-1B, the clock 33-2, the comparing means 33-3A and 33-3B, gates 33-4A and 33-4B, and the conflict control means 33-5.

The table 33-1A is used to set the transferable time (readable time) for each VP and the table 33-1B is used to set the transferable time (readable time) for each VC. The table 33-1A is updated by the output from the cell transfer time operating means 32-2A and the table 33-1B is updated by the output from the cell transfer time operating means 32-2B. The comparing means 33-3A compares the current time from the clock 33-2 with the readable time from the table 33-1A to select the time satisfying the condition of (current time<readable time). The comparing means 33-3B compares the current time from the clock 33-2 with the readable time from the table 33-1B to select the time satisfying the condition of (current time<readable time).

The gate 33-4A transfers only the readable VPI (or VPIs) corresponding to (current time<readable time) to the conflict control means 33-5, based on the comparison result from the comparing means 33-3A. The gate 33-4B transfers only the readable VCI (or VCIs) corresponding to (current time<readable time), based on the comparison result from the comparing means 33-3B, to the conflict control means 33-5.

The conflict control means 33-4 finds the most suitable combination (or combinations) among the readable VPI (or VPIs) selected by the gate 33-4A and the readable VCI (or VCIs) selected by the gate 33-4B and controls to read the cell matching with the optimum combination (or combinations) of VPI and VCI out of the cell buffer 31.

In such a manner, the cell which matches with the optimum combination of VPI and VCI can be read out of the cell buffer 31.

At the cell transfer time, the cell transfer timing operating unit 32 obtains the next cell transferable time and the parameter at the transferable time, based on the parameter at the previous cell transfer time. In this case the next cell transferable time as well as the parameter at the transferable time can be obtained to each VP or VC. In addition, the next cell transferable time and the parameter at the transferable time can be obtained when a cell is written to the cell buffer 31.

In the third embodiment, when each of the cell transfer time operating means 32-2A and 32-2B transfers the next cell transfer time information at a cell transfer time, the transferable time stored in the cell transfer control unit 33 is updated. However, the gate 33-4A outputs only the readable VPI (or VPIs) corresponding to (current time<transferable time), based on the comparison result from the comparing means 33-3A, to the conflict control means 33-5. The gate 33-4B outputs only the readable VCI (or VCIs) corresponding to (current time<transferable time), based on the comparison result from the comparing means 33-3B, to the conflict control means 33-5. The conflict control means 33-4 finds the most suitable combination (or combinations) among the readable VPIs from the gate 33-4A and the readable VCIs from the gate 33-4B and then controls to read the cell matching with the optimum combination (or combinations) of VPI and VCI out of the cell buffer 31.

When it is decided that the cell transfer interval can be transferred at the peak rate, the cell transfer time operating means 32-2A divides the sum of the parameter counter value Ca from the parameter counter 32-1A and the first parameter T by the second parameter Xa while the cell transfer time operating means 32-2B divides the sum of the parameter counter value Cb from the parameter counter 32-1B and the first parameter T by the second parameter Xb, where Ca is a count value for each VP of the parameter counter 32-1A and Cb is a count value for each VC of the parameter counter 32-1B.

When it is decided that the cell transfer interval is out of the peak rate, the initializing means 32-25A and 32-25B are operated to divide the first parameter T by the second parameter X.

In either case, the residue is registered as a new parameter to the parameter counter 32-1A for each VP and the parameter counter 32-1B for each VC.

Thereafter, as described above, the sum of the quotient and the current time is registered as the next transferable time in the cell transfer control unit 33.

It is possible to set the transfer interval of the next coming cell to the peak rate or more.

According to the third embodiment, when the VP and VC are multiplexed differently, the next transferable time is evaluated only at the time the cell buffer receives a cell or transfers a cell. Hence it is unnecessary to subtract the second parameter X from all VPs or VCs during every cell processing time. Therefore, the output highway can be effectively used because a cell is sent to other VPs and VCs if the device has no cells to be transferred to all VPs and VCs.

In other words, in the third embodiment, since the peak rate can be set independently to other VPs and VCs, without depending on set values for other VPs and VCs, the statistical multiplexing effect can be effectively utilized. In addition, the cell transfer rate controllable at regular intervals facilitates the range management, thus performing a fine control according to the information speed.

(e) Explanation of Fourth Embodiment

Figure 8:
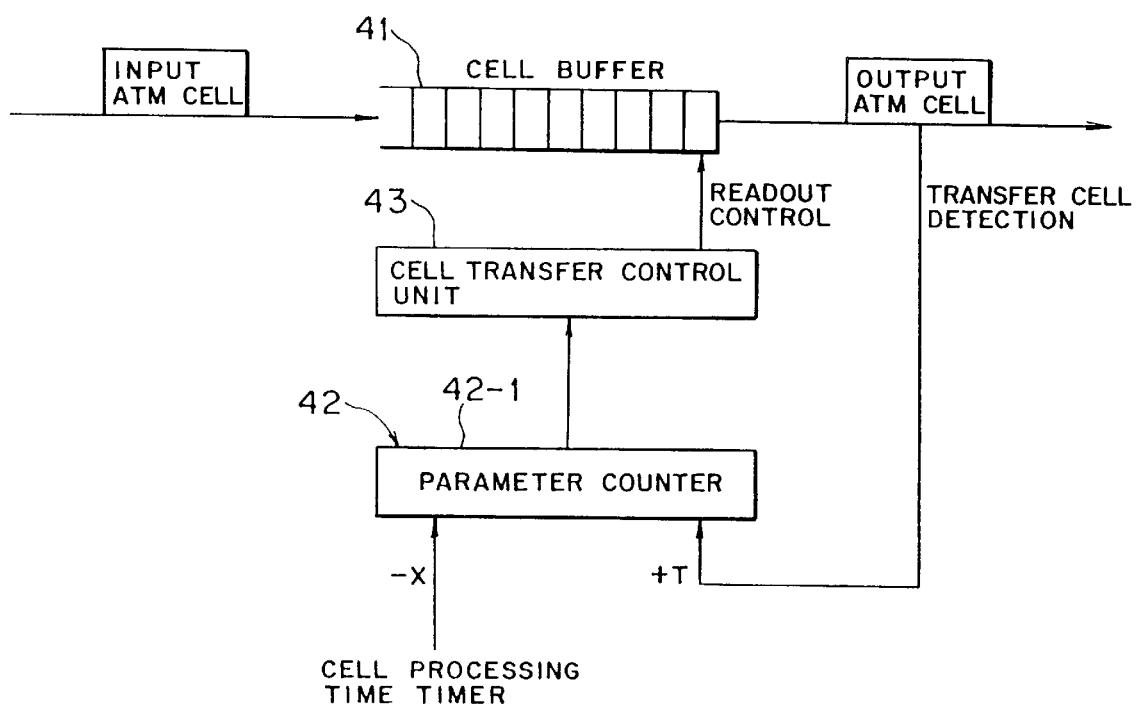
FIG. 8 is a flowchart explaining the main portion of the fourth embodiment of the present invention.

FIG. 8 is a block diagram showing the fourth embodiment according to the present invention. Referring to FIG. 8, the cell buffer 41 stores temporarily cells and holds them until a transferable time. FIFO memories and RIFO memories, for example, are used as the buffer memory 41.

The cell transfer control device includes the cell transfer timing operating unit 42. The cell transfer timing operating unit 42 performs a desired operation to obtain a cell transfer time, using the first parameter T (integer) set to a desired value and the second parameter X (integer: X≦T) set to a value smaller than the first parameter T and having information caused by one cell processing time.

The cell transfer control unit also includes the cell transfer control unit 43 which controls the cell transfer timing of the cell buffer 41, based on the operation result from the cell transfer timing operating unit 42, to perform a cell transfer control at a peak rate of X/T with respect to the device processing rate.

In the fourth embodiment, the cell transfer timing operating unit 42 also includes the parameter counter 42-1 which adds the first parameter at a cell transfer time and, subtracts the second parameter X from the value of the parameter counter every time one processing time passes, and then issues the next cell transfer information to the cell transfer control unit 43 when the resultant parameter is smaller than the second parameter X or (X−1).

The parameter counter 42-1 counts up by T at cell transfer intervals and counts down by X at cell processing time intervals. The parameter counter 42-1 informs the cell transfer control unit 43 of the count value information. In other words, the parameter counter 42-1 subtracts X from the parameter of cell-monitor algorithm at one-cell cycle intervals and then transfers a cell when the parameter is smaller than (X−1). The cell transfer control unit 43 compares the count value from the parameter counter 42-1 with X If the count value is smaller than X, the parameter counter 42-1 transfers a cell stored in the cell buffer 1.

As described above, the parameter counter 42-1 counts up by T and then counts down by X at one cell processing time intervals. Hence, the cell transfer control can be performed at a peak rate of X/T with respect to the device processing rate, by setting TX, or the total number of count-up values plus the total number of count-down values, to TX during a T-cell period when the maximum number of cells are transferred. Thus, X cells can be controllably transferred during a T-cell period.

(f) Others

The cell transfer control unit 100 that consists of the cell transfer control buffer, the cell transfer timing operating unit, and the cell transfer control unit can be installed at various places.

Figure 9:
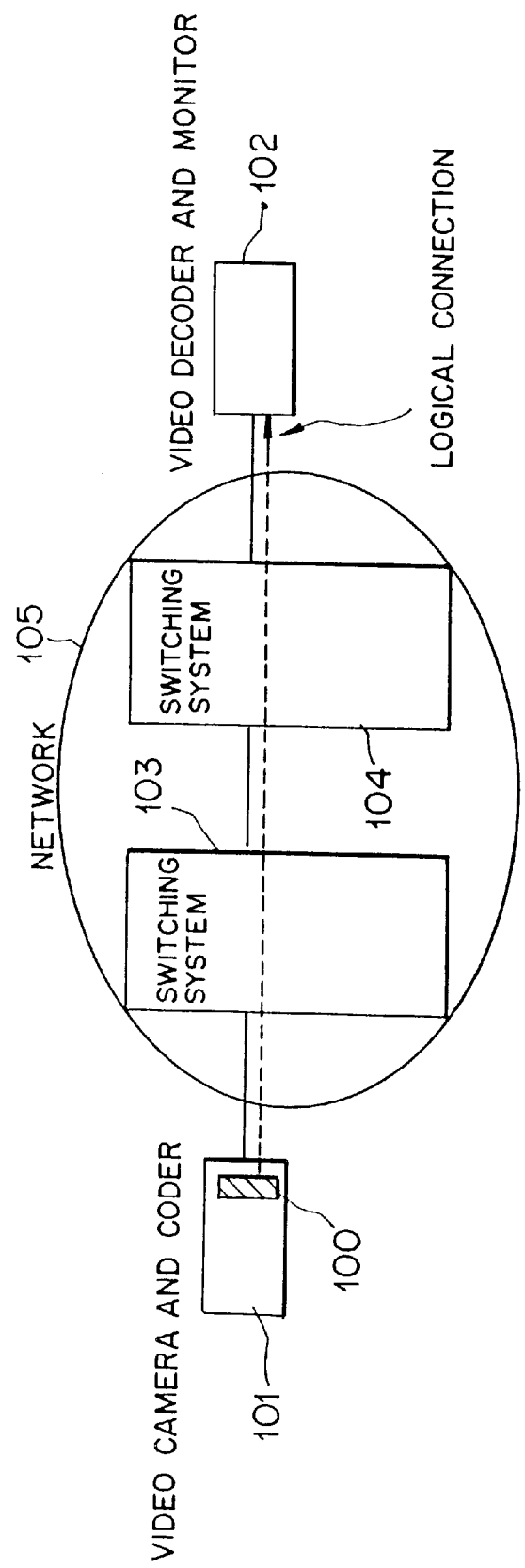
FIG. 9 is a diagram explaining the place where the device according to the present invention is installed.

As shown in FIG. 9, where the video camera and coder 101 is connected to the video decoder and monitor 102 via the network 105 including switching systems 103 and 104 (e.g. like the first embodiment), the cell transfer control device 100 can be mounted on the video camera and coder 101.

As shown in FIG. 10, where the ATM PBX 202 connected to the network 201 accommodates the video terminal 203, the voice terminal 204, the data terminal 205, and the like, the cell transfer control unit 100 can be mounted on customer equipment such as the video terminal 203, the voice terminal 204, and the data terminal 205, in addition to the ATM PBX 205.

Furthermore, as shown in FIG. 11, where plural exchange systems 301-1 to 301-3 are mutually connected via the cross-connect systems 302-1 to 302-3, the cell transfer control system 100 can be mounted inside the exchange systems 301-1 to 301-3 or the cross connect systems 302-1 to 302-3. Moreover, in the exchange systems 301-1 to 301-3 or the cross-connect systems 302-1 to 302-3, the cell transfer control device 100, as shown in FIG. 12, can be mounted to the line terminations 401 and 402, the multiplexer 403, the switch 404, the service server 405, or the demultiplexer 406.

What is claimed is:

1. A cell transfer control method for controlling a cell transfer in an asynchronous transfer mode (ATM) system including cellulating means that cellulates of a television image, which is divided by time frames, into successive fixed-length cells and buffer means that temporarily stores the cells from the cellulating means and intermittently transfers the same one after the next, comprising the steps of:

(a) obtaining a cell transferable time for the next cell based on the result of calculation of (T+C)/X where T is a first parameter representing the ratio of a period of every time frame to a cell process period needed for every cell, X is a second parameter representing a number of cells to be transferred in the period of every time frame and satisfying X≦T, and C is a variable count parameter representing a residue of the calculation of T/X at a cell transfer time or a cell writing time for the previous cell and satisfying C≧0; and (b) controlling the buffer means of the ATM system to transfer said next cell at said obtained cell transferable time.

2. A cell transfer control method according to claim 1, wherein said cell transferable time for the next cell is obtained by adding said first parameter T to said count parameter C and subtracting said second parameter X from the sum of said first parameter T and said count parameter for every cell process period until a current value of said count parameter C becomes smaller than said second parameter X, whereupon the buffer means is controlled to transfer said next cell.

3. A cell transfer control method according to claim 1, wherein said cell transferable time for the next cell and an updated value of said count parameter C are obtained from the values of said parameters T, X and C at said cell transfer time for time previous cell.

4. A cell transfer control method according to claim 3, wherein said current value of said count parameter C is reset to its initial value if the next cell cannot be transferred from the buffer means at said obtained cell transferable time for the next cell.

5. A cell transfer control method for controlling a cell transfer in an asynchronous transfer mode (ATM) system including cellulating means that cellulates input data into successive fixed-length cells, each of which has virtual channel (VC) information or virtual path (VP) information, and buffer means that temporarily stores the cells from the cellulating means and intermittently transfers to exchange means the same one after the next, comprising the steps of:

(a) obtaining a cell transferable time for the next cell based on the result of calculation of (T+C)/X where T is a first parameter representing the ratio of a processing rate of the exchange means to a minimum exchange unit rate of the exchange means for each VC or VP, X is a second parameter representing band information about a VC or VP defined as an integral multiple of the minimum exchange unit rate and satisfying X≦T, and C is a variable count parameter representing a residue of the calculation of T/X at a cell transfer time or a cell writing time for the previous cell and satisfying C≧0; and (b) controlling the buffer means of the ATM system to transfer said next cell at said obtained cell transferable time.

6. A cell transfer control method according to claim 5, wherein said cell transferable time for the next cell is obtained by adding said first parameter T to said count parameter C and subtracting said second parameter X from the sum of said first parameter T and said count parameter for every cell process period until a current value of said count parameter C becomes smaller than said second parameter X, whereupon the buffer means is controlled to transfer said next cell.

7. A cell transfer control method according to claim 5, wherein said cell transferable time for the next cell and an updated value of said count parameter C are obtained from the values of said parameters T, X and C at said cell transfer time for the previous cell.

8. A cell transfer control method according to claim 7, wherein said current value of said count parameter C is reset to its initial value if the next cell cannot be transferred from the buffer means at said obtained cell transferable time for the next cell.

9. A cell transfer control device for controlling a cell transfer in an asynchronous transfer mode (ATM) system including cellulating means that cellulates of a television image, which is divided by time frames, into successive fixed-length cells and buffer means that temporarily stores the cells from the cellulating means and intermittently transfers the same one after the next, comprising;

cell transfer timing operating means for obtaining a cell transferable time for the next cell based on the result of calculation of (T+C)/X where T is a first parameter representing the ratio of a period of every time frame to a cell process period needed for every cell, X is a second parameter representing a number of cells to be transferred in the period of every time frame and satisfying X≦T, and C is a variable count parameter representing a residue of the calculation of T/X at a cell transfer time or a cell writing time for the previous cell and satisfying C≧0; and buffer control means for controlling the buffer means of the ATM system to transfer said next cell at said obtained cell transferable time.

10. A cell transfer control device according to claim 9, wherein said cell transfer timing operating means includes:

an adder for adding said first parameter T to said count parameter C; and a subtractor for subtracting said second parameter X from the sum of said first parameter T and said count parameter for every cell process period until a current value of said count parameter C becomes smaller than said second parameter X, whereupon the buffer means is controlled to transfer said next cell.

11. A cell transfer control device according to claim 9, further comprising a parameter counter for registering said residue, which is obtained from the result of calculation of (T+C)/X by said cell transfer timing operating means for the cell transferable time for the next cell, as an updated value of said count parameter C at every transfer time.

12. A cell transfer control device according to claim 11, wherein said parameter counter is reset to its initial value if the buffer means cannot transfer the next cell at said obtained cell transferable time for the next cell.

13. A cell transfer control device according to claim 9, further including a timer for monitoring said cell transfer time so that said cell transfer timing operating means may obtain said cell transferable time for the next cell and an updated value of said count parameter C from the values of said parameters T, X and C at said cell transfer time for the previous cell.

14. A cell transfer control device for controlling a cell transfer in an asynchronous transfer mode (ATM) system including cellulating means that cellulates input data into successive fixed-length cells, each of which has virtual channel (VC) information or virtual path (VP) information, and buffer means that temporarily stores the cells from the cellulating means and intermittently transfers to exchange means the same one after the next, comprising:

(a) cell transfer timing operating means for obtaining a cell transferable time for the next cell based on the result of calculation of (T+C)/X where T is a first parameter representing the ratio of a processing rate of the exchange means to a minimum exchange unit rate of the exchange means for each VC or VP, X is a second parameter representing band information about a VC or VP defined as an integral multiple of the minimum exchange unit rate and satisfying X≦T, and C is a variable count parameter representing a residue of the calculation of T/X at a cell transfer time or a cell writing time for the previous cell and satisfying C≧0; and (b) buffer control means for controlling the buffer means of the ATM system to transfer to the exchange means said next cell at said obtained cell transferable time.

15. A cell transfer control device according to claim 14, wherein said cell transfer timing operating means includes:
an adder for adding said first parameter T to said count parameter C and a subtractor for subtracting said second parameter X from the sum of said first parameter T and said count parameter for every cell process period until a current value of said count parameter C becomes smaller than said second parameter X, whereupon the buffer means is controlled to transfer said next cell.

16. A cell transfer control device according to claim 14, further comprising a parameter counter for registering said residue, which is obtained from the result of calculation of (T+C)/X by said cell transfer timing operating means for the cell transferable time for the next cell, as an updated value of said count parameter C at every transfer time.

17. A cell transfer control device according to claim 16, wherein said parameter counter is reset to its initial value if the buffer means cannot transfer the next cell at said obtained cell transferable time for the next cell.

18. A cell transfer control device according to claim 14, further including a timer for monitoring said cell transfer time so that said cell transfer timing operating means may obtain said cell transferable time for the next cell and an updated value of said count parameter C from the values of said parameters T, X and C at said cell transfer time for the previous cell.

19. A cell transfer control device according to claim 14, wherein said cell transfer timing operating means includes memory means for registering respectively said first parameter T, said second parameter X and said count parameter C.

20. A cell transfer control device for controlling a cell transfer in an asynchronous transfer mode (ATM) system including a video camera and coder, a video decoder and monitor, and a network composed of a plurality of switching systems over which a television image, in the form of successive frames each being formed of a number of successive fixed-length cells, is transferred for the video camera and coder to the video decoder and monitor, the said device being adapted to be installed at the rear stage of the video camera and coder and comprising:

buffer means for temporarily storing the cells from the video decoder and coder and intermittently transfers the same one after the next;

cell transfer timing operating means for obtaining a cell transferable time for the next cell based on the result of calculation of (T+C)/X where T is a first parameter representing the ratio of a period of every time frame to a cell process period needed for every cell, X is a second parameter representing a number of cells to be transferred in the period of every time frame and satisfying X≦T, and C is a variable count parameter representing a residue of the calculation of T/X at a cell transfer time or a cell writing time for the previous cell and satisfying C≧0; and buffer control means for controlling said buffer means to transfer said next cell at said obtained cell transferable time.

21. A cell transfer control device for controlling a cell transfer in an asynchronous transfer mode (ATM) system in which data in the form of fixed-length cells are transferred from various terminals to a network via an ATM exchange along respective virtual channel (VC) or virtual path (VP) connections, said device being adapted to be installed at the rear stage of at least one of the various terminals and/or the ATM exchange and comprising:

buffer means for temporarily storing the cells from the various terminals and intermittently transfers the ATM exchange the same one after the next;

cell transfer timing operating means for obtaining a cell transferable time for the next cell based on the result of calculation of (T+C)/X where T is a first parameter representing the ratio of a processing rate of the ATM exchange to a minimum exchange unit rate of the ATM exchange for each VC or VP, X is a second parameter representing band information about a VC or VP defined as an integral multiple of the minimum exchange unit rate and satisfying X≦T, and C is a variable count parameter representing a residue of the calculation of T/X at a cell transfer time or a cell writing time for the previous cell and satisfying C≧0; and buffer control means for controlling said buffer means to transfer said next cell at said obtained cell transferable time.

22. A cell transfer control device for controlling a cell transfer in an asynchronous transfer mode (ATM) system in which data in the form of fixed-length cells are transferred from one ATM exchange to another ATM exchange via a cross-connect system along a virtual channel (VC) connection or a virtual path (VP) connection, said device being adapted to be installed at the rear stage of at least one of the ATM exchanges and/or the cross-connect system and comprising:

buffer means for temporarily storing the cells and intermittently transfers the same one after the next;

cell transfer timing operating means for obtaining a cell transferable time for the next cell based on the result of calculation of (T+C)/X where T is a first parameter representing the ratio of a processing rate of the ATM exchange or cross-connect system to a minimum exchange unit rate of the ATM exchange or cross-connect system for each VP, X is a second parameter representing band information about a VC or VP defined as an integral multiple of the minimum exchange unit rate and satisfying X≦T, and C is a variable count parameter representing a residue of the calculation of T/X at a cell transfer time or a cell writing time for the previous cell and satisfying C≧0; and buffer control means for controlling said buffer means to transfer said next cell at said obtained cell transferable time.

23. A cell transfer control device for controlling a cell transfer in an asynchronous transfer mode (ATM) switching system including an input-side line termination, a multiplexer, a switch, a service server, a demultiplexer and an output-side line termination for transmitting image data in the form of fixed-length cells each representing at least one piece of virtual channel (VC) information or at least one piece of virtual path (VP) information, said device being adapted to be installed in at least one of the input-side line termination, the multiplexer, the switch, the service server, the demultiplexer and the output-side line termination, and comprising:

buffer means for temporarily storing the cells from the video decoder and coder and intermittently transfers the same one after the next;

cell transfer timing operating means for obtaining a cell transferable time for the next cell based on the result of calculation of (T+C)/X where T is a first parameter representing the ratio of a processing rate to a minimum exchange unit rate for each VC or VP, X is a second parameter representing band information about a VP defined as an integral multiple of the minimum exchange unit rate and satisfying $X \leq T$, and C is a variable count parameter representing a residue of the calculation of T/X at a cell transfer time or a cell writing time for the previous cell and satisfying $C \geq 0$; and buffer control means for controlling said buffer means to transfer said next cell at said obtained cell transferable time.

24. A cell transfer control method for controlling a cell transfer in an asynchronous transfer mode (ATM) system transfers input successive cells of a fixed length including logical channel information and data information intermittently, comprising the steps of:

providing a cell buffer for receiving the input successive cells and temporarily storing the individual cell;

calculating a cell transferable time for a current one of the successive cells using a first parameter T and as second parameter X equal to or smaller than said first parameter T ($X \leq T$) where T is an integer representing the ratio of a period of every time frame to a cell process period needed for every cell and X is an integer representing a number of cells to be transferred in the period of every time frame, said calculating including adding said first parameter T at every cell transfer time, and subtracting said second parameter X from said first parameter T for every cell process time; and controlling said cell buffer to transfer said current one cell when a current count parameter value of said subtracting becomes smaller than X−1, which time is treated as said cell transferable time.

25. A cell transfer control apparatus for controlling a cell transfer in an asynchronous transfer mode (ATM) system transfers input successive cells of a fixed length including logical channel information and data information intermittently, comprising: a cell transfer control buffer for receiving the input successive cells and temporarily storing the individual cell;

cell transfer timing operating means for calculating a cell transferable time for a current one of the successive cells using a first parameter T and a, second parameter X equal to or smaller than said first parameter T ($X \leq T$) where T is an integer representing the ratio of a period of every time frame to a cell process period needed for every cell and X is an integer representing a number of cells to be transferred in the period of every time frame; and buffer control means for controlling said buffer means to transfer said current one cell at said calculated cell transferable transfer said current one cell at said calculated cell transferable time;

said cell transfer timing operating means including a parameter counter for adding said first parameter T at every cell transfer time and subtracting said second parameter X from said first parameter T for every cell process time, said parameter counter being operable to notify said buffer control means of a current count parameter value so that said buffer control means outputs a cell transfer signal to said cell transfer control buffer when said current count parameter value becomes smaller than X−1, which time is treated as said cell transferable time.

26. A cell transfer control method for controlling a cell transfer in an asynchronous transfer mode (ATM) system including cellulating means that cellulates input data into successive fixed-length cells, and buffer means that temporarily stores the cells from the cellulating means and intermittently transfers the same one after the next, comprising the steps of:

(a) obtaining a cell transferable time for the next cell based on the result of calculation of (T+C)/X where T is a first parameter being an integer, X is a second parameter being a characteristic integer for a single cell processing time and satisfying $X \leq T$, and C is a variable count parameter representing a residue of the calculation of T/X at a cell transfer time or a cell writing time for the previous cell and satisfying $C \geq 0$; and (b) controlling the buffer means of the ATM system to transfer said next cell at said obtained cell transferable time.

27. A cell transfer control device for controlling a cell transfer in an asynchronous transfer mode (ATM) system including cellulating means that cellulates input data into successive fixed-length cells, and buffer means that temporarily stores the cells from the cellulating means and intermittently transfers the same one after the next, comprising:

(a) cell transfer timing operating means for obtaining a cell transferable time for the next cell based on the result of calculation of (T+C)/X where T is a first parameter being an integer, X is a second parameter being a characteristic integer for a single processing time and satisfying $X \leq T$, and C is a variable count parameter representing a residue of the calculation of T/X at a cell transfer time or a cell writing time for the previous cell and satisfying $C \geq 0$; and (b) buffer control means for controlling the buffer means of the ATM system to transfer to the exchange means said next cell at said obtained cell transferable time.

* * * * *